Aug. 4, 1936.  J. DICHTER  2,050,088
FORMING MACHINE
Filed March 16, 1935  3 Sheets-Sheet 1

INVENTOR
JACOB DICHTER

BY
Charles B. Belknap
ATTORNEY

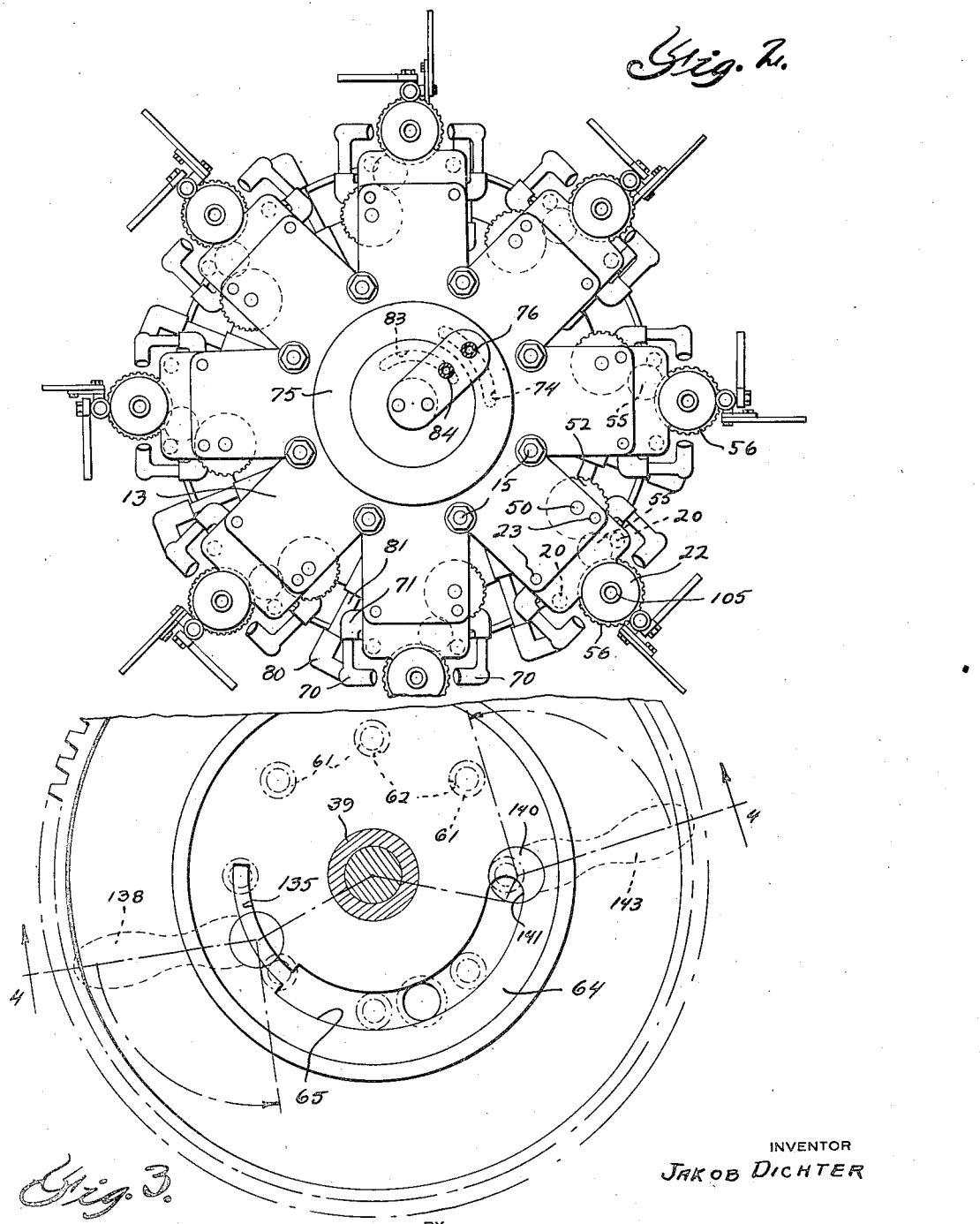

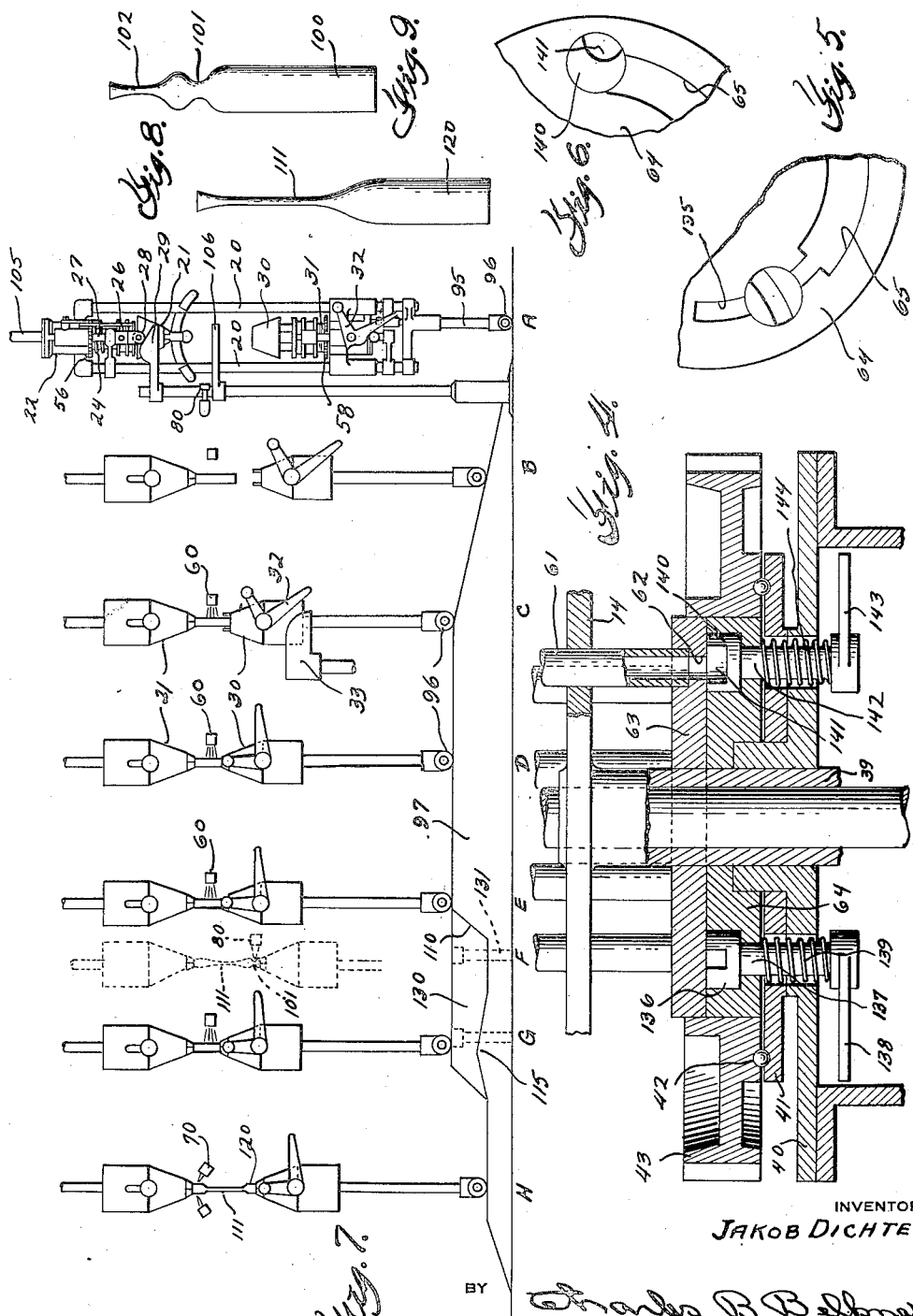

Patented Aug. 4, 1936

2,050,088

UNITED STATES PATENT OFFICE 2,050,088

FORMING MACHINE

Jakob Dichter, Berlin-Schoneberg, Germany

Application March 16, 1935, Serial No. 11,389
In Germany March 16, 1934

10 Claims. (Cl. 49—7)

This invention relates to forming machines and has particular reference to a machine adapted for the production of ampoules or like glass bodies.

One of the primary objects of this invention is to provide means in a machine of the above mentioned character for increasing the production of the machine.

A further object of this invention is to provide means in a machine of the above mentioned character for decreasing the variations in the air and/or gas supply incident to use of larger or smaller burners.

Numerous other objects and advantages of this invention will become more apparent as the following description proceeds particularly when reference is had to the accompanying drawings wherein Fig. 1 is a fragmentary vertical sectional view through a machine constructed in accordance with the teachings of this invention;

Fig. 2 is a semi-diagrammatic top plan view of the machine;

Fig. 3 is an enlarged fragmentary plan view of a portion of the machine;

Fig. 4 is a sectional view taken substantially on the line 4—4 of Fig. 3;

Fig. 5 is a fragmentary detail plan view of a portion of the structure shown in Fig. 3;

Fig. 6 is a view similar to Fig. 5 showing another part of the structure shown in Fig. 3;

Fig. 7 is a diagrammatic view showing the several steps in the process;

Fig. 8 is an elevational view of an ampoule adapted to be formed by the machine; and Fig. 9 is an elevational view of a modified type of ampoule.

Figure 1:
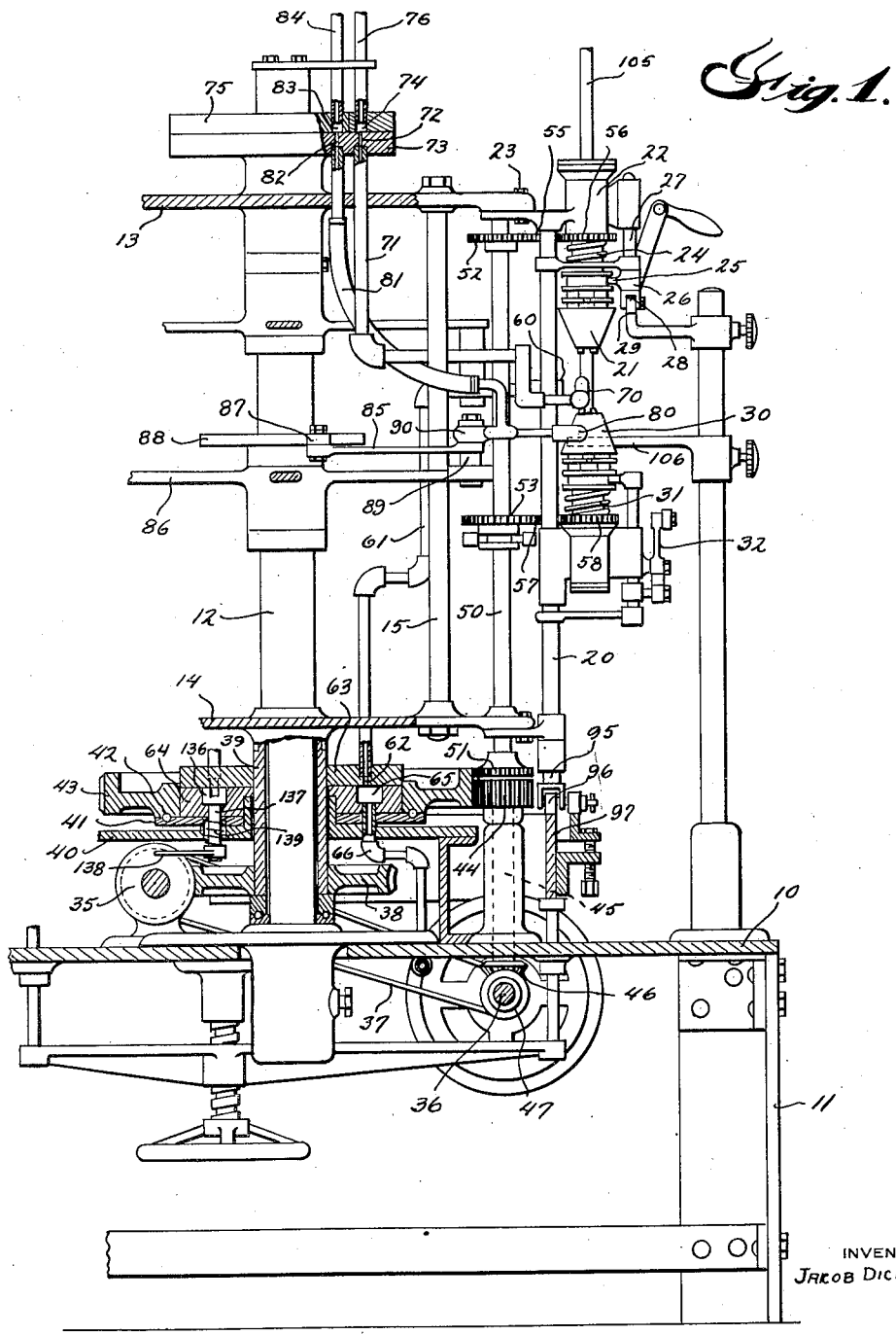

For the sake of illustration, the present invention has been disclosed as being incorporated in a machine of the type described and claimed in my Patent #1,962,985 issued June 12, 1934, and entitled, "Machine for the manufacture of ampullas and the like glass bodies". It is to be expressly understood, however, that the inventive principles forming the subject matter of this application may be incorporated in machines other than that disclosed in my said patent.

In the drawings, the numeral 10 designates a base plate or platform suitably supported in spaced relation to the floor by legs or the like 11. Carried by the base plate and projecting vertically therefrom is a standard 12 on which upper and lower star plates or spiders 13 and 14 respectively, are journalled. These star plates are coupled together for rotation as a unit by tie rods 15 and these star plates carry suitable chucks for gripping the glass tube during the forming operations.

In the embodiment illustrated there are eight sets of chucks, it being understood that the chucks that are carried by or are associated with the upper plate 13 are in alignment with the corresponding chucks carried by the lower plate 14. For each pair of chucks there are provided two rods 20, these rods being arranged in spaced relation to each other and extending vertically between the upper and lower plates as clearly illustrated in Fig. 7 of the drawings.

The upper chucks which may be of any desired character, are designated by the reference character 21 and these chucks are journalled in bearings 22 which are rigidly secured to the upper plate 13 as at 23. The upper chucks are closed by springs 24 and are adapted to be opened by suitable means such for example, as the fingers 25 carried by collars 26, fixed to supporting rods 27 which are mounted for vertical sliding movement. The rods 27 carry at their lower ends rollers 28 adapted to be engaged by a fixedly mounted cam 29, upon rotation of the plate 13.

Aligned with each upper chuck 21 is a lower chuck 30 and each lower chuck is adapted to be closed by a spring 31. The lower chucks are mounted for vertical sliding movement on the rods 20 and are adapted to be opened and closed against the force of the springs 31 by suitable levers 32 arranged to be actuated by a fixedly mounted cam 33, the arrangement being such that during a portion of the rotation of the plates 13 and 14 about the center shaft 12, the lower chucks are opened.

For rotating the plates 13 and 14 there is provided a worm gear 35 driven from a main drive shaft 36 by a belt or the like 37. The worm gear drives a worm wheel 38 which is fixed to the sleeve 39 of the lower plate 14, this sleeve being suitably journalled on the shaft 12 as will be apparent.

For rotating the chucks 21 and 30 about their axes, the following structure is provided. Carried by the platform 10 and spaced above the same is a supporting plate 40 and carried by this plate is a ball race 41 for the bearings 42 which support a gear 43. This gear is driven from the shaft 36 by virtue of the pinion 44 mounted on the upper end of a shaft 45 this latter shaft being coupled to the shaft 36 by the bevel gears 46 and 47.

Associated with each pair of chucks is a vertical shaft 50 and each shaft carries at its lower end a gear 51 which meshes with and is driven by the gear 43. Each shaft 50 additionally carries gears 52 and 53. Each gear 52 drives through an intermediate gear 55 a gear 56 fixed to one of the upper chucks 21. Each gear 53 drives through an intermediate gear 57 a gear 58 fixed to a lower chuck 30. The gears 53 are keyed to their respective shafts 50 for movement longitudinally thereof upon vertical movement of the lower chucks 30.

Associated with each pair of chucks is a burner 60, and for supplying fuel such as gas or gas and air to these burners each burner is provided with a supply pipe 61, the opposite end of which communicates with an opening 62 formed in a plate 63 mounted for rotation with the lower plate 14. It will be understood that an annular series of openings 62 are provided in the plate 63 and that the pipes 61 and the plate 63 rotate with the plates 13 and 14 and thus about the shaft 12 with the chucks.

Carried by the plate 40 and thus fixed against rotation is a disk 64 provided with a channel 65 with which the ports 62 register. Fuel is supplied to the channel 65 by means of a supply pipe 66 with the result that as the ports 62 register with channel 65 fuel is supplied to the burners. As will be later brought out, the channel 65 extends only partly around the shaft 12 with the result that each burner 60 is supplied with fuel during a predetermined portion only of its travel around shaft 12.

Additionally, associated with each pair of chucks are burners 70 likewise adapted to be ignited during a portion of the movement of the chucks about the shaft 12. These burners are adapted for severing a formed ampoule from the remainder of the glass tube from which the ampoule is formed and are also so arranged as to form an ampoule bottom on the adjacent end of the glass tube. These burners are supplied with fuel by pipes 71, each pipe registering with a port 72 formed in a plate 73 and rotatable with the upper plate 13. The ports 72 are arranged to register during a portion of the rotation of plate 73 with a channel 74 formed in a disk 75 rigidly carried by the upper end of shaft or standard 12. A fuel such as gas or the like is supplied to channel 74 by a suitable supply pipe 76.

For the purpose of forming constrictions in the ampoules as will hereinafter be more fully described, the machine is provided with burners 80, there being one of these burners associated with each pair of chucks. Each burner 80 is provided with a supply pipe 81 and each supply pipe communicates with a port 82 formed in the disklike plate 73. The ports 82 are arranged to communicate during a portion of the rotation of the plate 73 with a channel 83 formed in the stationary disk 75, fuel being supplied to this channel by means of supply pipe 84.

The burners 80 are moved toward and away from the ampoules being formed by means of a lever 85 carried by a plate 86, which is fixed for rotation with the plates 13 and 14. The lever 85 carries at its one end a roller 87 which engages a stationary cam 88. Each lever 85 is pivotally supported as at 89 on the plate 86 and supports its respective burner 80 by an arm 90.

For the purpose of raising the lower chucks 30 there is associated with each lower chuck an arm 95 the lower end of which carries a roller 96. This rod is mounted for vertical sliding movement and its upper end is arranged to engage the chuck body to raise the same. A cam 97 surrounds the standard 12 and the rollers 96 ride on this cam as clearly illustrated in Fig. 7 of the drawings.

The machine as thus far described is identical with that disclosed in my Patent #1,962,985. The machine is adapted for the formation of ampoules of the shape shown in Fig. 9 of the drawings. As illustrated, these ampoules comprise a body 100, a constriction 101, and an end portion 102 of reduced cross sectional area.

In operation, a length of glass tubing designated by the numeral 105, is placed in each upper chuck and rotation of the plates 13 and 14 and the associated structure is then effected. The first station is illustrated at the right of Fig. 7 and is designated by the reference A. At this station the upper chuck is opened by the cam 29 permitting the glass rod to drop until its lower end engages a support 106.

Rotation of the plates 13 and 14 causes the chucks to move to the left as viewed in Fig. 7 and during their movement from stations A to B, the upper chuck is permitted to close thus grasping the length of tube 105. It will be noted at station B that the lower chuck is being moved upwardly by the incline of the cam 97, the arrangement being such that at position C the lower chuck has moved upwardly sufficiently to embrace the free end of the glass tube at which time the lower chuck is permitted to close by the cam 33. During its travel from station C to station E, the glass tube is heated by the burners 60, it being understood that during this travel the port 62 of the burner associated with the chuck the operation of which is being discussed, communicates with the channel 65 so that burner 60 is supplied with fuel. At station E the cam 97 is provided with an abrupt drop 110 whereby the lower chuck is permitted to move downwardly by the force of gravity to form the elongated portion 111 of reduced cross sectional area in the tube.

During further movement of the chucks toward the left, the glass tubes are heated by the burners 80 to produce a softened portion whereupon the lower chuck is moved upwardly by the slight upward incline 115 in the cam 97. This coupled with the action of the burners 80 causes the constriction 101 to be formed in the ampoule.

The burners 70 are then ignited and the ampoule severed from the remainder of the glass tube as diagrammatically illustrated at station H.

It will be understood that each upper chuck carries a length of glass tubing and that the above described operations are successively performed on each length of glass tubing so that the operation is continuous there being eight ampoules of the character shown in Fig. 9 formed upon each complete rotation of the plates 13 and 14. While the rotation of these plates is continuous, the plates must be rotated sufficiently slowly to permit the proper heating of the glass tube before the lower chuck is permitted to move downwardly to form the reduced portion 111 in the ampoule.

The present invention is directed more particularly to the provision of means for speeding up the operation of the machine in the event that ampoules are to be formed which do not have the constrictions 101. An example of such an ampoule is shown in Fig. 8 wherein it will be noted that the ampoule comprises only a body 120 and a reduced portion 111.

It will be obvious that in the forming of the ampoule shown in Fig. 8, it is necessary first to remove the burners 80 or to so secure the same that they will not operate. It will be apparent further that if the burners 80 are removed or rendered inoperative, no work is accomplished on the glass tube during its travel from stations E to G and the present invention therefore contemplates the provision of means whereby this movement of the ampoule will not be wasted but rather utilized for heating the glass tube prior to the lowering of the lower chuck. This longer interval of heating of the glass tube permits a more rapid rotation of the plates 13 and 14 and thus increases the production of the machine.

To accomplish the desired results, there is first provided a section 130 adapted to be secured to the cam 97 as by the bolts 131. The section 130 prevents lowering of the lower chuck until the chuck has moved past station G with the result that during the movement of the chuck from stations E to G, the body of the glass tube may be further heated by the burners 60.

In order, however, to maintain the burners 60 ignited, it is necessary to increase the length of the channel 65, and in Figs. 3, 4 and 5 the mechanism for accomplishing this is disclosed.

As illustrated, the channel is provided with the main portion 65 and the extension 135. A channelled member 136 rotatably supported in the disk 64 constitutes a valve which in the position illustrated in Fig. 3 of the drawings opens communication between portions 65 and 135 of the channel. When, however, the valve is turned to the position shown in Fig. 5, it is obvious that the length of the channel 65 is reduced to such an extent that the burner 60 will be extinguished at station E.

The valve is provided with a stem 137 to which is secured a suitable actuating handle 138. A spring 139 frictionally restrains the valve against rotation so that the valve shall remain in either open or closed position, as desired.

Additionally, the invention provides means to restrict variations in the flame incident to the use of larger or smaller burners and for this purpose there is provided at the opposite end of the channel 65 a rotatable member 140 having a recess 141 adapted to register with the end of the channel 65 when the member 140 is properly rotated.

It will be noted that member 140 has a stem 142 to which is secured a handle 143 by which the member may be rotated and that additionally there is provided a spring 144 which frictionally restrains the member 140 against rotation.

The member 140 constitutes a second valve which lengthens or shortens the channel 65 by a few millimeters with the result that the capacity of this channel may be adjusted within limits. Thus it will be apparent that at each end the channel 65 may be elongated if desired, to thus control the actuation of the burners 60.

From the above it is believed that the invention will be readily understood. In Fig. 7, the position of the chucks at station F is diagrammatically illustrated in dotted lines since when the inventive principles embodied in this application are utilized, it will be understood that the chucks do not assume the position illustrated at this station. It is only when ampoules of the character shown in Fig. 9 as described in my previously mentioned patent are to be formed that station F becomes of particular importance.

When ampoules without constrictions are to be utilized, the channel 65 is elongated by opening the valve 136 with the result that the glass tube may be rapidly moved from station C to station G, being heated during this entire movement after which the lower chuck may be permitted to drop downwardly to produce constriction 111 in the cross sectional area of the glass tube.

While the invention has been described as being incorporated in the machine disclosed in my prior patent, it will be understood that the inventive principles may be incorporated in other machines. In its broader aspects, the invention provides a cam, the length of which may be increased or diminished at the will of the operator. Additionally, the invention provides a fuel supply chamber or channel with which the inlet end of a fuel supply pipe communicates. The fuel supply pipe is adapted to move longitudinally of the chamber to receive fuel therefrom and provision is made to increase or diminish the length of the chamber to thus vary the period of supply of fuel from the chamber to the supply pipe. Thus in a machine having means for supplying fuel to a burner and for automatically terminating the fuel supply after a predetermined time interval, the invention provides means whereby the interval of supply of fuel to the burner may be effectively controlled.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a machine of the class described, a burner, a fuel supply pipe for said burner, means for moving the inlet end of said supply pipe along a definite path, means providing a fuel supply chamber with which the inlet end of said pipe registers during a portion of the movement of the pipe, and means for varying the extent of said chamber in the direction of the travel of the pipe.

2. In a machine of the class described, a burner, and a means for controlling the supply of fuel to said burner comprising a pair of plates mounted for movement relative to each other, one of said plates having a channel and the other of said plates having a port through which the fuel may flow from the channel to the burner, the channel and port being so arranged in their respective plates that the port communicates with the channel during a portion of the relative movement of said plates, means for supplying fuel to said channel, and means for varying the capacity of said channel.

3. In a machine of the class described, a burner, and a means for controlling the supply of fuel to said burner comprising a pair of plates mounted for movement relative to each other, one of said plates having a channel and the other having a port through which fuel may flow to the burner, said port and channel being so arranged that during a portion of the relative movement of said plates the port moves longitudinally of the channel and in communication with the same, and means for varying the length of said channel.

4. In a machine of the class described, a pair of gripping devices for gripping a length of tubing, means for moving said gripping devices as a unit along a predetermined path, a burner movable with said gripping devices for heating the tubing supported thereby, adjustable means for varying the interval of supply of fuel to said burner, and a cam providing for relative movement of said gripping devices toward and away from each other, said cam having a removable section whereby the contour of the cam may be adjusted.

5. In a control means for a burner, a stationary plate having an elongated channel opening through one face thereof, a second plate movable relative to the first mentioned plate and having a port adapted to register with the channel during a portion of the movement of the second plate, means for supplying fuel to said channel, and means for adjusting the length of said channel to vary the interval of communication of the port with the channel.

6. In a means for controlling the flow of fuel to a burner, a disk having a channel opening through one face thereof, a second disk in face contact with said first mentioned disk and having a port adapted to register with the channel, means for rotating the second disk with reference to the first disk, and a valve disposed between the ends of said channel operable to cut off communication between one end of the channel and the remainder thereof.

7. In a means for controlling the flow of fuel to a burner, a disk having an arcuate channel opening through one face thereof, a second disk mounted for rotation relative to the first disk and having a port adapted to register with the channel during said rotation, the channel in said disk having an extension at one end thereof, and a valve between said extension and the main part of said channel for cutting off communication between the said extension and the main part of the channel.

8. In a means for controlling the flow of fuel to a burner, a disk having an arcuate channel opening through one face thereof, a second disk mounted for rotation with reference to the first disk and having a port registering with the channel, the arcuate shape of the channel and the location of the port being such that upon rotation of the second disk with reference to the first disk the port communicates with the channel throughout the length of the channel, a rotatable member at one end of said channel operable to vary the length of the channel, an extension at the other end of said channel and a rotatable valve controlling communication between the extension and the main part of the channel.

9. In combination, means providing a fluid supply chamber, means providing a port through which fluid may flow from said chamber to a point of use, means for effecting relative movement between said port and chamber, said port and chamber being so arranged that during a portion of said relative movement the port communicates with the chamber, and means for varying the extent of said chamber in the direction of relative movement between said port and chamber.

10. In a machine of the class described, means for moving a glass article along a predetermined path, means for heating the glass article during a portion of the movement thereof along said path, means for controlling the actuation of said heating means, means for adjusting said control means to vary the extent of travel of the glass article during which the same is heated, means arranged to shape the glass article subsequent to the heating thereof, means controlling the actuation of said shaping means, and means for adjusting said last mentioned means incident to an adjustment of said heater control means to maintain a predetermined desired relation between the actuation of the heating means and the actuation of the shaping means.

JAKOB DICHTER.